A. Y. HUBBELL.
Improvement in Axle for Vehicles.

No. 127,167.  Patented May 28, 1872.

Witnesses:

Inventor
Arthur Y. Hubbell
per
Attorneys.

UNITED STATES PATENT OFFICE.

ARTHUR Y. HUBBELL, OF NEW YORK, N. Y.

IMPROVEMENT IN AXLES FOR VEHICLES.

Specification forming part of Letters Patent No. 127,167, dated May 28, 1872; antedated May 11, 1872.

*To all whom it may concern:*

Be it known that I, ARTHUR Y. HUBBELL, of the city of New York, in the county of New York and in the State of New York, have invented certain new and useful Improvements in Axle for Vehicles; and do hereby declare that the following is a full, clear, and exact description thereof, reference being had to the accompanying drawing and to the letters of reference marked thereon making a part of this specification.

The nature of my invention consists in the construction and arrangement of an "axle for vehicles," as will be hereinafter more fully set forth.

In order to enable others skilled in the art to which my invention appertains to make and use the same, I will now proceed to describe its construction and operation, referring to the annexed drawing, in which—

Figure 1:
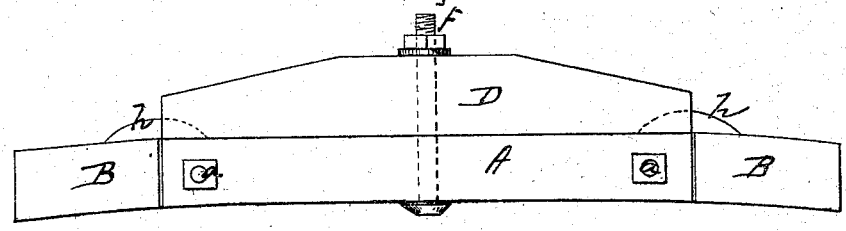
Figure 2:
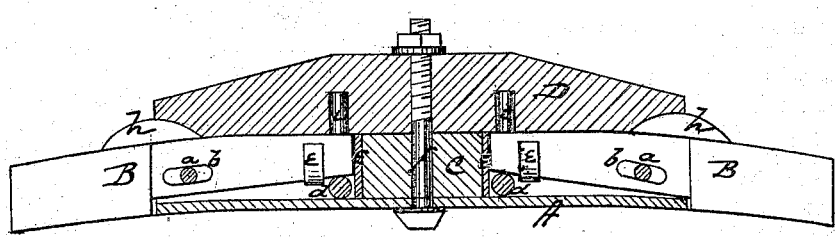

Figure 1 is a side view, and Fig. 2 a longitudinal vertical section of my axle.

My axle is made in three parts, (one center-tube, A, and two end arms, B B,) the dimensions of which will be about as follows: The tube A, about two feet long, and the arm B, from each end of the tube to the inside of the hub, about fourteen inches. The arms B B are pivoted in the ends of the tube A by means of bolts $a$ $a$, which pass through elongated holes or slots $b$ $b$ in the arms, as shown in Fig. 2. The inner end of each arm rests upon rubber $d$, and rubber $e$ is also packed on the sides and end of each arm. In the center of the tube A, between the inner ends of the arms B B is a stationary block, through which a bolt, $f$, passes to fasten the bolster D. The elongated holes or slots $b$ $b$ in the arms give end-play to the axle. On the upper side of each arm, above the slot $b$, is a rib, $h$, which fits in a recess on the under side at the end of the bolster. These ribs not only answer the purpose of forming a rest for the bolster, but also strengthen the axle at the elongated holes or slots. In the under side of the bolster D, above the ends of the arms B B, rubber $i$ is inserted, so that the inner ends of said arms are packed with rubber on all sides.

In an ordinary axle, which is all in one piece, if either wheel is raised in running over an obstruction the center of the axle and the wagon is raised half as much. With my improvement, when the wheel strikes an obstruction, raising the wheel and end of the axle, the inner end, resting on rubber, compresses the rubber, allowing the axle to turn on the bolt so as to lift the wagon only very little, if any.

Having thus fully described my invention, what I claim as new, and desire to secure by Letters Patent, is—

1. An axle with a joint or hinge so arranged that the wheel can rise without a corresponding rise of the axle where the wagon rests upon it, substantially as herein set forth.

2. An axle made with joints or sockets, and working upon rubber or other elastic substance so as to ease the jar of the wagon, substantially as herein set forth.

3. An axle made in two or more pieces, hinged together so that the wheels will act independently of each other, substantially as herein set forth.

4. The elongated hole or slot $b$ in the arm B, through which the bolt passes to fasten the arm in the end of the tube A, substantially as and for the purposes herein set forth.

5. The rib $h$ running on top of the axle, substantially as and for the purposes herein set forth.

In testimony that I claim the foregoing I have hereunto set my hand this 18th day of October, 1871.

ARTHUR Y. HUBBELL.

Witnesses:
   C. A. THOMPSON,
   THEO. D. GERE.